United States Patent [19]

Hori et al.

[11] Patent Number: 5,448,653
[45] Date of Patent: Sep. 5, 1995

[54] LINE SEGMENT ATTRIBUTE RECOGNITION DEVICE HAVING ACCURACY UPDATING FUNCTION

[75] Inventors: Osamu Hori; Shigeyoshi Shimotsuji, both of Tokyo; Fumihiko Hoshino, Okegawa; Toshiaki Ishii, Ichikawa, all of Japan

[73] Assignees: Kabushiki Kaisha Toshiba, Kawasaki; Tokyo Electric Power Company, Incorporated, Tokyo, both of Japan

[21] Appl. No.: 218,293

[22] Filed: Mar. 28, 1994

Related U.S. Application Data

[63] Continuation of Ser. No. 921,334, Jul. 29, 1992, abandoned.

[30] Foreign Application Priority Data

Jul. 29, 1991 [JP] Japan ................................. 3-188811

[51] Int. Cl.$^6$ ............................................. G06K 9/46
[52] U.S. Cl. .................................... 382/202; 382/203
[58] Field of Search ................... 382/16, 24, 25, 26, 382/36, 37; 345/24–26, 133, 135, 132; 395/133, 135, 143

[56] References Cited

U.S. PATENT DOCUMENTS

| | | | |
|---|---|---|---|
| 4,654,873 | 3/1987 | Fujisawa | 382/9 |
| 4,887,302 | 12/1989 | Urushibata | 382/9 |
| 4,933,977 | 6/1990 | Ohnishi | 382/9 |
| 5,129,012 | 7/1992 | Abe | 382/16 |
| 5,159,647 | 10/1992 | Burt | 382/37 |
| 5,204,915 | 4/1993 | Nishida | 382/21 |

OTHER PUBLICATIONS

IEEE, 1981 pp. 438–440, H. Bunke, "Probabilistic Relaxation for the Interpretation of Electrical Schematics."

IEEE, 1990 pp. 706–708, M. Gerald, "Discrete Relaxation Applied to Interpretation of Technical Documents."

*Primary Examiner*—Joseph Mancuso
*Attorney, Agent, or Firm*—Oblon, Spivak, McClelland, Maier & Neustadt

[57] ABSTRACT

Information regarding the line segments constituting a line figure is input from an input section. An initial degree of certainty with respect to the attribute of each of the line segments is calculated by a degree of certainty-calculating section, on the basis of the information input from the input section. How the line segments are connected to other line segments is detected by a connection-detecting section. A compatible coefficient is determined by a degree of certainty-updating section in accordance with the connection detected by the connection-detecting section. By repeatedly executing calculation on the basis of the compatible coefficient, the initial degree of certainty calculated by the degree of certainty-calculating section is updated. Based on the updated degree of certainty, the attributes of the line segments are determined.

11 Claims, 6 Drawing Sheets

|  | CABLE | TOPO-GRAPHIC LINE | LEADER | BLOCK | AUXILIARY LINE |
|---|---|---|---|---|---|
| CABLE | 0.0 | 0.0 | -1.0 | 0.0 | -1.0 |
| TOPOGRAPHIC LINE | 0.0 | -0.5 | 0.5 | 0.0 | 0.0 |
| LEADER | -1.0 | 0.5 | -1.0 | -0.5 | -1.0 |
| BLOCK | 0.0 | 0.0 | -0.5 | -1.0 | -1.0 |
| AUXILIARY LINE | -1.0 | 0.0 | -1.0 | -1.0 | -1.0 |

FIG. 7

|  | CABLE | TOPO-GRAPHIC LINE | LEADER | BLOCK | AUXILIARY LINE |
|---|---|---|---|---|---|
| CABLE | 0.0 | 0.0 | -1.0 | 1.0 | -1.0 |
| TOPOGRAPHIC LINE | 0.0 | 1.0 | 0.0 | 0.0 | 0.0 |
| LEADER | 1.0 | 0.0 | -1.0 | 1.0 | -1.0 |
| BLOCK | 0.0 | 0.0 | -1.0 | -1.0 | -1.0 |
| AUXILIARY LINE | -1.0 | 0.0 | 1.0 | -0.5 | -1.0 |

FIG. 8

|  | CABLE | TOPO-GRAPHIC LINE | LEADER | BLOCK | AUXILIARY LINE |
|---|---|---|---|---|---|
| CABLE | 1.0 | 0.0 | 0.0 | 0.0 | 0.0 |
| TOPOGRAPHIC LINE | 0.0 | 1.0 | 0.0 | 0.0 | 0.0 |
| LEADER | 0.0 | 0.0 | 1.0 | 0.0 | 0.0 |
| BLOCK | 0.0 | 0.0 | 0.0 | 1.0 | 0.0 |
| AUXILIARY LINE | 0.0 | 0.0 | 0.0 | 0.0 | 1.0 |

LINE SEGMENT ATTRIBUTE RECOGNITION DEVICE HAVING ACCURACY UPDATING FUNCTION

This application is a Continuation of application Ser. No. 07/921,334, filed on Jul. 29, 1992, now abandoned.

BACKGROUND OF THE INVENTION

1. Field of the Invention

The present invention relates to a line segment construction device for construing the attribute information (e.g., the category) of line segments that constitute a line figure, such as a map or a system diagram.

2. Description of the Related Art

In a conventional figure generating apparatus for generating and editing a line figure, such as a system diagram of computer aided design (CAD), it is desired that the data on the line segments of a line figure be processed with high efficiency. For high-efficient processing, the attribute information (e.g., the category) on the line segments of a line figure is entered in a computer.

In this type of figure generating apparatus, a line figure is displayed on the screen. While looking at the line figure on the screen, the operator designates a given line segment by means of a mouse, a digitizer, or the like. The operator judges the attribute information on the designated line segment by visually confirming the relationships which the line segment has with reference to the other line segments, and manually enters the result of the judgment.

In the above figure generating apparatus, the operator has to judge the attribute information on all line segments of a line figure by visually confirming the relationships of each line segment to the other, and to manually enter the result of the judgment. Accordingly, the data input operation is very troublesome, and the operator has to concentrate his or her attention on the data input operation. If the operator's power of attention decreases, it is likely that data will be entered incorrectly, adversely affecting the accuracy of the attribute information. If it is necessary to occasionally warn the operator to direct attention to the data input operation, the time needed for the data input operation is lengthened, accordingly. As a result, the efficiency of the data input operation lowers, and the cost of the resultant line figure will be high.

One of the ways for solving the problems may be to provide the apparatus with a function of automatically determining the attribute information on the line segments of a line figure. If, in this case, each of the line segments of a line figure is examined singly, it is not possible to obtain information sufficient for reliable determination of the category of the line segment. In other words, the category of each line segment has to be determined on the basis of symbols and characters located in the vicinity of the line segment, the relative position of the line segment to the other ones, and the manner in which the line segment is connected to other ones. A computer may be used for the recognition of symbols and characters, but recognition by means of a computer is not very reliable. It sometimes happens that a computer will incorrectly recognize symbols and characters. If the symbols and characters are incorrectly recognized, the category of the line segment related to them cannot be determined until the categories of the other line segments are determined. In this manner, the information input to the computer is indefinite, and decision theoretic inference may not be carried out only with the information input to the computer.

The techniques related to the present invention are disclosed in H. Bunke et al, "PROBABILISTIC RELAXATION FOR INTERPRETATION SCHEMATICS", Proceeding of Pattern Recognition and Image, pp. 438–440 and M. Gerald et al., "Discrete Relaxation Applied of Technical Documents", Proceeding of ICPR, pp. 706–708.

SUMMARY OF THE INVENTION

Accordingly, an object of the present invention is to provide a line segment construction device which is capable of automatically determining the attribute information (e.g., the categories) of the line segments of a line figure with high accuracy and at high speed, and which permits a data input operation for obtaining attribute information to be performed with high efficiency and thereby contributes to reduction in cost.

To achieve this object, the present invention provides a line segment construction device which construes the attributes (e.g., the categories) of line segments that constitute a line figure and which comprises: an input section for inputting information regarding the line segments of the line figure; a degree of certainty-calculating section for calculating an initial degree of certainty with respect to the attribute of each of the line segments, on the basis of the information input by the input section; a connection-detecting section for detecting how each of the line segments is connected to another line segment; a degree of certainty-updating section for determining a compatible coefficient in accordance with the connection detected by the connection-detecting section and updating the initial degree of certainty calculated by the degree of certainty-calculating section by repeatedly executing calculation on the basis of the compatible coefficient; and an attribute-determining section for determining the attribute of each of the line segments on the basis of the degree of certainty updated by the degree of certainty-updating section.

According to the present invention, the initial degree of certainty is determined with respect to each of the line segments of a line figure, and this initial degree of certainty is repeatedly updated in accordance with the compatible coefficient determined on the basis of the connection between the line segments. By obtaining a high degree of certainty in this manner, a very probable attribute can be determined with respect to each of the line segments. Accordingly, the attributes of the line segments constituting a line figure can be automatically construed with high accuracy.

According to the line segment construction device of the present invention, it is possible to automatically construe the attributes (e.g., the categories) of the line segments constituting a line figure with high accuracy and at high speed, with no need for a manual data input operation. Therefore, the data input operation for obtaining attribute information can be performed with high efficiency, and the cost can be reduced thereby. In addition, since the attribute information on each segment is obtained as probability information, inappropriate construction of attribute information can be easily corrected by selecting the next degree of certainty. Accordingly, easy and accurate data editing is ensured.

DETAILED DESCRIPTION OF THE PREFERRED EMBODIMENTS

An embodiment of the present invention will now be described with reference to the accompanying drawings.

Figure 1:
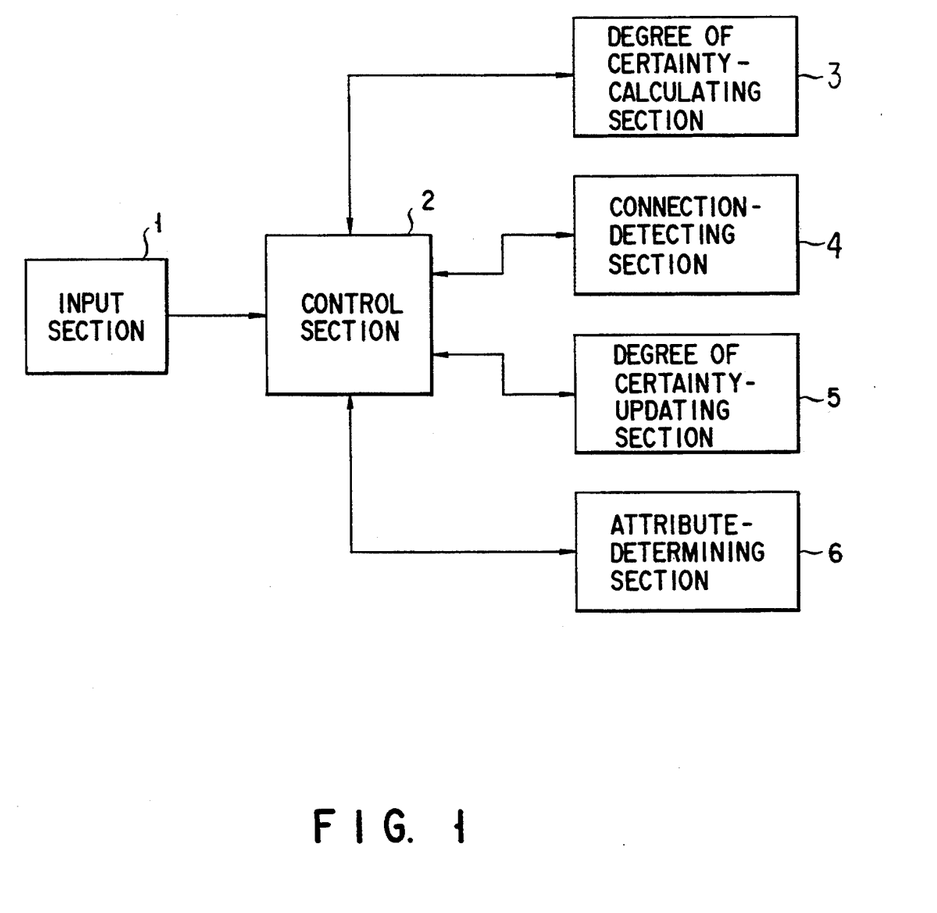
FIG. 1 is a schematic block diagram showing the structure of one embodiment of the present invention.

FIG. 1 is a schematic block diagram showing the structure of a line segment construction device according to one embodiment of the present invention. In FIG. 1, imparting a category on a line segment can be said to be "labeling the line segment", and the degree of certainty represents the probability of a certain label being given to a line segment. The number of labels used is equal to the number of categories determined for the line segments, and the labels have one-to-one correspondence to the categories.

The line segment construction device of the embodiment comprises an input section 1, a control section 2, a degree of certainty-calculating section 3, a connection-detecting section 4, a degree of certainty-updating section 5, and an attribute-determining section 6.

The input section 1 is a section from which information regarding the line segments constituting a line figure is input. The input section 1 utilizes conventionally-known character/pattern recognition technology. In the case of a line segment, the input section 1 detects a straight portion of the line segment and identifies the type of the line segment. In the case of a character string, the input section 1 detects the region within which the character string exists, and further detects how the character string is related with the surrounding region, for example, whether the character string is located in the vicinity of a line segment or connected to the line segment. In the case of a symbol, the input section 1 identifies it, along with its type. The input section 1 further detects how the symbol is related with the surrounding region, for example, whether the symbol string is located in the vicinity of a line segment or connected to the line segment. The information regarding line segments may be manually input by means of a pointing device, such as a mouse or a light pen.

The data entered from the input section 1 is supplied to the control section 2.

The control section 2 is connected to sections 3, 4, 5 and 6 mentioned above and supplies control signals to them. Further, the control section 2 controls data exchange between sections 3, 4, 5 and 6.

The degree of certainty-calculating section 3 calculates an initial degree of certainty with respect to the category (label) of a line segment on the basis of the line segment information entered from the input section 1. The calculation is carried out, using the result of the pattern recognition of the data related to the line segment.

Figure 2:
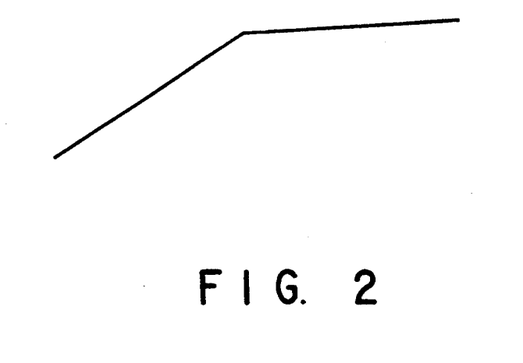
FIG. 2 shows an intersection between line segments.
Figure 3:
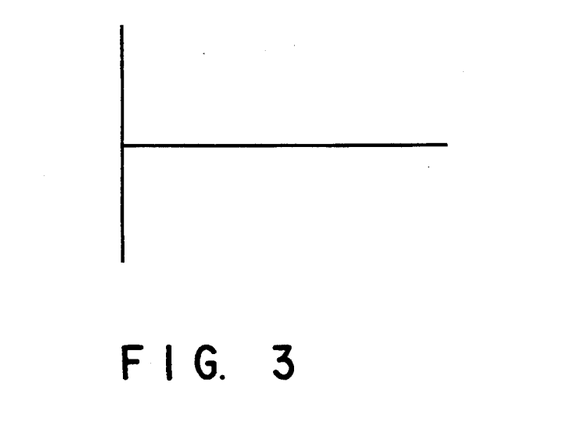
FIG. 3 shows a "T"-shaped branch section of line segments.
Figure 4:
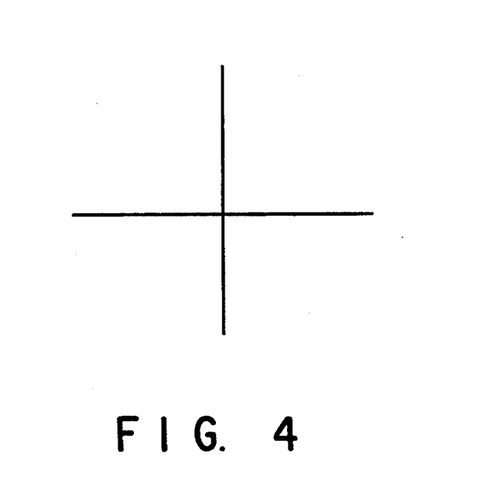
FIG. 4 shows a coupling section of line segments.

The connection-detecting section 4 examines how each line segment is connected to other ones. For example, the connection-detection section 4 detects a "T"-shaped branch section, an intersection and a coupling section with respect to the line segments. The connection-detecting section 4 detects the "T"-shaped branch section if two line segments are in contact with each other in the shape of a "T", as indicated in FIG. 3, detects the intersection if the two line segments intersect each other, as is indicated in FIG. 4, and detects the coupling section if the two line segments are simply coupled to each other, as shown in FIG. 2.

On the basis of the connection detected by the connection-detecting section 4, the degree of certainty-updating section 5 determines a compatible coefficient. The compatible coefficient represents the extent to which two terms of the category (label) of a line segment are related to each other. By repeatedly executing the calculation, the degree of certainty (probability) initially obtained by the degree of certainty-calculating section 3 is updated.

The attribute-determining section 6 determines the time at which the update based on the repeated calculation performed by the degree of certainty-updating section should be stopped, thereby determining one category (label) with respect to each line segment. The time at which the update should be stopped can be determined by one of the following methods:

a method wherein the update is stopped when the calculation has been repeated by the number of times which is determined as being appropriate by experience;

a method wherein the entropy of the degree of certainty has decreased and a stable state is obtained; and a method wherein the update is automatically stopped when a contribution coefficient has become lower than a predetermined threshold value.

The category (label) of each line segment is determined when the repeated updating of the degree of certainty is stopped.

The above embodiment will be described more specifically, referring to the line figure shown in FIG. 5.

Figure 5:
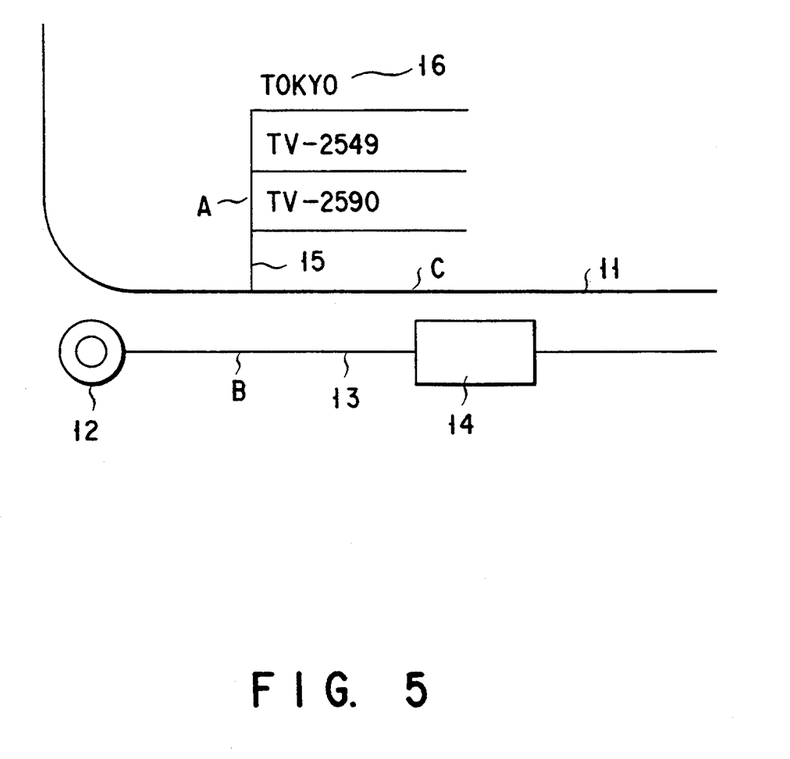
FIG. 5 is an example of a line figure.

FIG. 5 is a line figure representing an electric power system indicated on a map. FIG. 5 contains a topographic line 11, a symbol 12 for indicating equipment, a cable 13 connected to the symbol 12, a block 14 for indicating equipment of indeterminate shape, a leader 15 for indicating which cable is explained by a character string 16, and an auxiliary line 17 for indicating the area of a character string. In FIG. 5, the number of categories which should be identified for line segments is five: namely, the categories for the topographic line 11, the cable 13, the block 14, the leader 15, and the auxiliary line 17.

Figure 6:
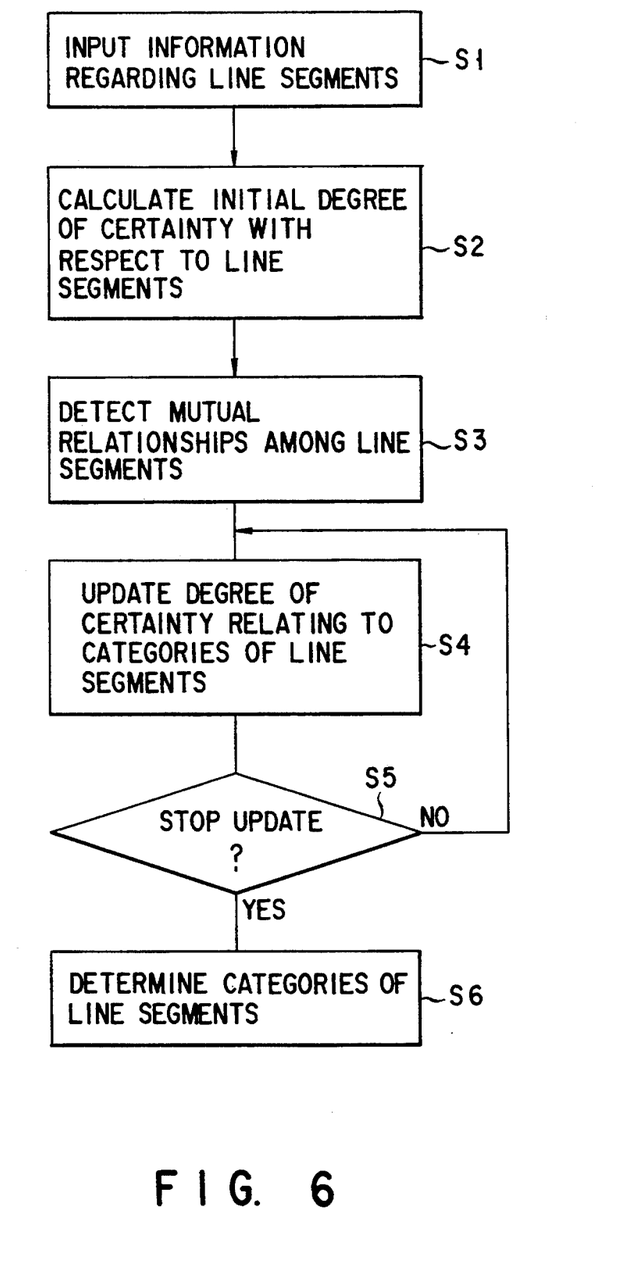
FIG. 6 is a flowchart illustrating the operation of the embodiment shown in FIG. 1.

How the line figure shown in FIG. 5 will be processed by the device of the present invention will be explained with reference to FIGS. 1 and 6. FIG. 6 is a flowchart illustrating the embodiment shown in FIG. 1.

Referring to FIG. 6, information regarding the line segments of the line figure shown in FIG. 5 is entered from the input section 1 (step S1). At the time of data entry, character/pattern recognition technology is utilized. With respect to the topographic line 11, the cable 13, the leader 15 and the auxiliary line 17, their straight portions are extracted, and results of the type identification based on the extracted straight portions are entered. In regard to the character string 16, its region is extracted, and results of the recognition of the relationship between the character string and the related line segment are entered. As for the symbol 12, its type and its relationship with the line segment connected thereto are recognized.

Then, an initial degree of certainty (probability) is calculated with respect to the categories (labels) of the line segments, on the basis of the information entered from the input section 1 (step S2). In step S2, the initial probability of the category (label) of each line segment is calculated on the basis of the information on each line segment, and is determined on the basis of the information regarding the symbol 12, the character string 16 and the categories. The initial probability is determined as follows. If no information is entered with respect to a certain line segment, the same initial probability is determined for all probable categories (labels) of the line segment. If the rate of recognition differs dependent on the types of symbol 12 and character string 16, the initial probability is determined in accordance with the different rates of recognition. If the rate of recognition is high, a large initial value is determined. On the other hand, if the rate of recognition is low, a small initial value is determined.

The specific calculation of the initial probability is carried out as follows:

In the beginning, the same point is given to the five labels (in the case of the present embodiment, the labels are "cable", "topographic line", "leader", "block" and "auxiliary line"). If influential information is discovered with respect to a label which can be determined for a line segment, the point corresponding to the label is increased. The point number given to each category (label) is divided by the total sum of the points of the categories (labels) given to each line segment, with the result that the initial probability enabling the total sum to become 1.0 is given. For example, the following points are added to each line segment when the following information is given to each line segment:

(1) [category]
  (a) broken line
    5 points are given to cable
  (b) one-point-dash line
    3 points are given to cable and topographic line
  (c) long simple line
    5 points are given to topographic line
(2) [symbol 12]
  (a) if equipment a is connected,
    5 points are given to cable
  (b) if equipment b is connected,
    10 points are given to cable
(3) [character string 16]
  (a) if Chinese character exists in the neighborhood,
    3 points are given to auxiliary line
  (b) if English or numeral letter exists in the neighborhood,
    10 points are given to auxiliary line In the case where the broken line is used for expressing only the cable, the point of the cable is increased. In the case where the one-dot-dash line is used for expressing both the cable and the topographic line, the points of the cable and the topographic line are increased. In the case of the symbol 12, the point which is given to the cable when equipment b is recognized is set to be larger than that when equipment a is recognized, on the assumption that the recognition rate of equipment a is higher than that of equipment b. Similarly, in the case of the character string 16, the point which is given to the auxiliary line when an English or numeral letter is recognized is set to be larger than that when a Chinese character is recognized, on the assumption that the recognition rate of the English or numeral letter is higher than that of the Chinese character.

Next, the connection-detecting section 4 examines how each line segment is connected to other ones (step S3), so as to detect a "T"-shaped branch section, an intersection and a coupling section. In the case of FIG. 5, line segment A is in contact with line segment B in a "T"-shaped pattern, so that the "T"-shaped branch section shown in FIG. 3 is detected. Line segment A intersects line segment C, so that the intersection shown in FIG. 3 is detected.

The degree of certainty-updating section 5 updates the degree of certainty (probability) initially obtained by the degree of certainty-calculating section 3 (step S4). In this step, a compatible coefficient, i.e., the extent to which two terms of the category (label) of a line segment are related to each other, is determined on the basis of the connection detected by the connection-detecting section 4. By repeatedly executing calculation using the compatible coefficient, the degree of certainty (probability) initially obtained is updated.

The compatible coefficient indicates the extent to which the categories (labels) of line segments are compatible with each other. The compatible coefficient is in the range of $-1.0$ to $1.0$. If the compatible coefficient is $1.0$, the categories (labels) of line segments are compatible with each other. Conversely, if the compatible coefficient is $-1.0$, the categories (labels) of line segments are not compatible with each other. If the compatible coefficient is $0.0$, the categories (labels) of line segments are irrelevant to each other.

The compatible coefficients are determined by experience on the basis of the relationships between the line segments constituting a line figure to be processed. Needless to say, the compatible coefficient may be determined on the basis of the meanings of the categories (labels), or on the basis of the statistic frequencies of the labels. The compatible coefficients differ, dependent on a combination of the categories and the relationships among the "T"-shaped branch section, the intersection and coupling section. The compatible coefficients used in the case of the intersection are shown in FIG. 7, those used in the case of the "T"-shaped branch section are shown in FIG. 8, and those used in the case of the coupling section are shown in FIG. 9.

Figure 7:
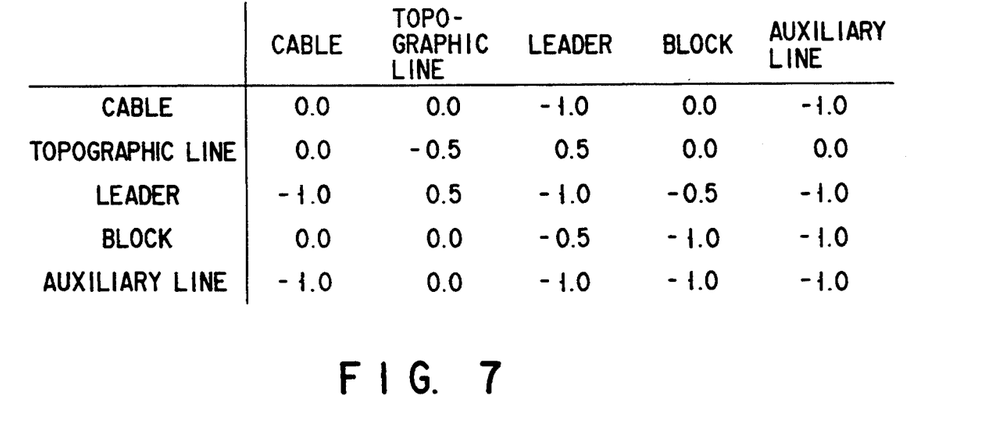
FIG. 7 is a table listing compatible coefficients determined with respect to an intersection of line segments.
Figure 8:
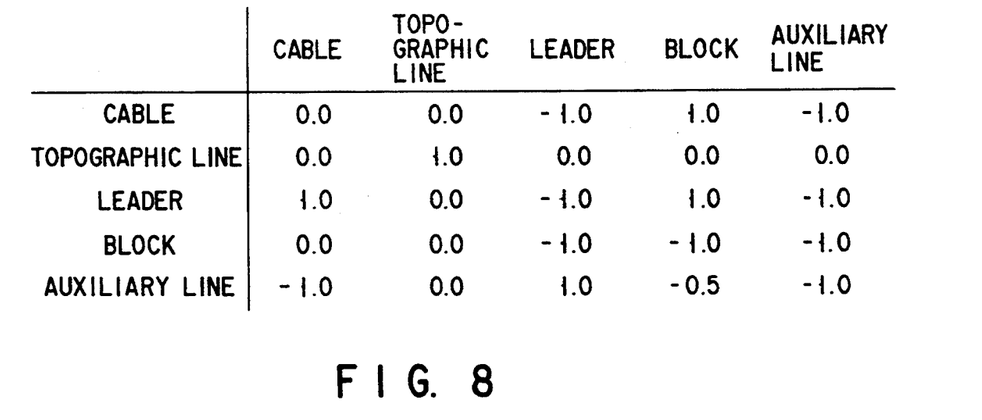
FIG. 8 is a table listing compatible coefficients determined with respect to a "T"-shaped branch section of a line segment.
Figure 9:
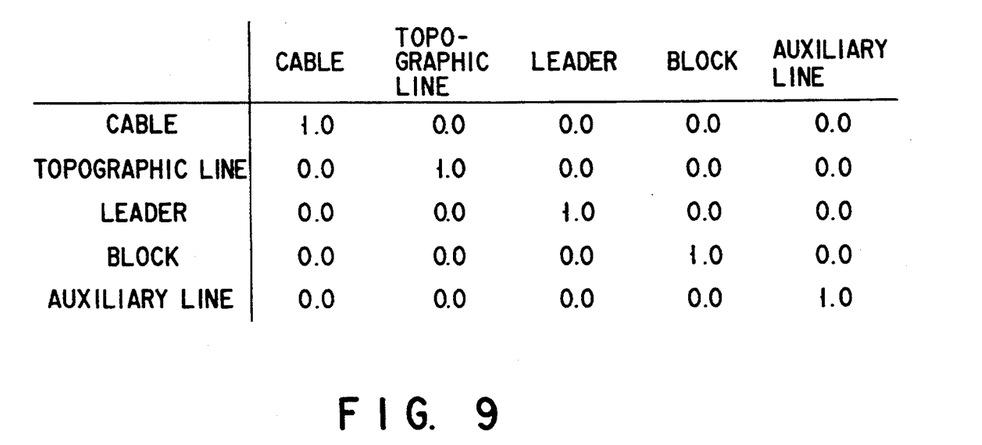
FIG. 9 is a table listing compatible coefficients determined with respect to a coupling section between two line segments.

In the cases of the intersection and coupling section respectively shown in FIGS. 7 and 9, the matrix is symmetric, while in the case of a "T"-shaped branch section, the matrix is not symmetric. The reason for this will be explained.

In the case of the intersection shown in FIG. 7, the relationship between the line segments is fixed, without reference to the line segment which is used as a reference. In other words, an arbitrary one of the line segments can be used as a reference when considering the relationship. The same thing holds true of the case of the coupling section shown in FIG. 9.

In the case of the "T"-shaped branch section, however, the relative positions of line segments are important to determine the relationship between them. To be more specific, the relationship between the line segments differs between the case where one end of line segment "-" is connected to line segment "|" and the case where one end of line segment "|" is connected to line segment "-". Accordingly, in the case of the "T"-shaped branch section, line segment "|" is listed as a row category (label), while line segment "-" is listed as a column category. For example, where one end of line segment "-" is connected to line segment "|" of the cable 13, this connection constitutes a well-compatible relationship, so that the compatible coefficient in this case is determined as 1.0.

An example of the manner by which the compatible coefficients are determined will be described.

In the case of the intersection section shown in FIG. 7, an intersection between line segments of the same category (label) is limited to the cable 13, and line segments of different categories (labels) never intersect each other. Thus, most of the compatible coefficients listed in FIG. 7 are negative. However, it should be noted that the compatible coefficient corresponding to the relationship between the topographic line 11 and the leader 15 is determined as 0.5. The reason for this determination is that, in most cases, the cable 13 is buried in a road and extends parallel to the topographic line 11, while the leader 15 is drawn substantially perpendicular to the cable 13 and crosses the topographic line 11.

In the case of the branch section shown in FIG. 8, the relationship between the cable 13 and the leader 15, that between the topographic line 11 and the topographic line 11, that between the leader 15 and the auxiliary line 17, and that between the block 14 and the cable 13, are all determined as 1.0. For example, the case where one end of the leader 15 of the row "-" is connected to the cable 13 of column "|" in such a manner as to constitute a "T"-shaped branch section is probable, so that the compatible coefficient in this case is determined as 1.0. Conversely, the case where one end of the cable 13 of the row "-" is connected to the leader 15 of column "|" in such a manner as to constitute a "T"-shaped branch section is not probable, so that the compatible coefficient in this case is determined as −1.0.

In the case of the coupling section shown in FIG. 9, the compatible coefficients are expressed as a diagonal matrix. This means that continuous line segments have the same label. The reason for this is that line segments of different labels are never continuous.

On the basis of the compatible coefficients determined as above, the repeated calculation mentioned below is executed, so as to update the initially-calculated degree of certainty (probability).

(1) Let it be assumed that the set of line segment categories (labels) is expressed as $\Lambda = \{K, H, C, T, S\}$. Symbols K, H, C, T and S each denote a category (label), and the number of categories in the embodiment is five.

(2) Let it be assumed that the weight function dependent on the attribute of line segment i is determined as $d(i)$. The weight function is a function used for weighting the compatible coefficient in consideration of the length of a line segment and the connection thereof to other line segments.

(3) Let it be assumed that a compatible coefficient is $r_{ij}(\lambda, \lambda')$ in the case where line segments i and j have categories (labels) $\lambda$ and $\lambda'$, respectively.

(4) Let it be assumed that the probability that category (label) $\lambda$ will be determined for line segment i after calculation is repeated by k times is $p_i^k(\lambda)$. In this case, the following formula is constantly satisfied:

$$p_i^k(K) + p_i^k(C) + p_i^k(H) + p_i^k(T) + p_i^k(S) = 1.0$$

(5) Let it be assumed that the contribution function of a connection line to $p_i^k(\lambda)$ is $q_i^k(\lambda)$ after calculation is repeated by k times. In this case, $q_i^k(\lambda)$ is expressed as follows:

$$q_i^k(\lambda) = \sum_j \left[ \sum_{\lambda'} (d(j) \cdot r_{ij}(\lambda, \lambda') \cdot p_j^k(\lambda')) \right]$$

where j is a line segment related to segment i, and $\lambda'$ is the category (label) of line segment j.

In the above formula, the "$\Sigma$" appearing first represents the total sum of line segments j related to line segment i, and the "$\Sigma$" appearing next represents the total sum of labels $\lambda'$.

(6) The probability obtained after calculation repeated by (k+1) times can be derived from the probability $p_i^k$ obtained after calculation repeated by k times and the contribution coefficient $q_i^k$, as follows:

$$p_i^{k+1}(\lambda) = (p_i^k \cdot [1 + q_i^k(\lambda)]) / (\Sigma p_i^k(\lambda) \cdot [1 + q_i^k(\lambda)])$$

In the above update of the degree of certainty (probability), a long line segment is not likely to be noise, in comparison with a short line segment. Therefore, the probability of category (label) is updated first with respect to a long line segment, and then with respect to a short line segment. By carrying out the update in this manner, the degree of certainty (probability) can be updated with high reliability.

The attribute-determining section 6 determines the time at which the update based on the repeated calculation section should be stopped (step S5). If, in this step S5, the attribute-determining section 6 determines that the update should be repeated, the flow returns to step S4 so as to cause the degree of certainty-updating section 5 to repeat the update. If the attribute-determining section 6 determines that the update should be stopped, then only one category (label) is determined as being appropriate for each line segment. In other words, when it is determined in step S6 that the update should be stopped, the category (label) which is most probable for each line segment is determined.

As mentioned above, according to the present invention, the degree of certainty-calculating section calculates an initial degree of certainty with respect to each of the line segments of a line figure input from the input section 1, and the degree of certainty-updating section 5 repeatedly updates the initial degree of certainty in accordance with the compatible coefficient which the connection-detecting section 4 determines on the basis of the connection between the line segments. By obtaining a high degree of certainty in this manner, a very probable attribute can be determined with respect to each of the line segments. Accordingly, the attributes of the line segments constituting the line figure can be automatically construed with high accuracy. It is possible to automatically construe the attributes (e.g., the categories) of the line segments constituting the line figure with high accuracy and at high speed, with no need for a manual operation. Therefore, the data input operation for obtaining attribute information can be performed with high efficiency, and the cost can be reduced thereby. In addition, since the attribute information on each segment is obtained as probability information, inappropriate construction of attribute information can be easily corrected by selecting the next degree of certainty. Accordingly, easy and accurate data editing can be ensured.

The present invention is not limited to the embodiment mentioned above.

Figure 10:
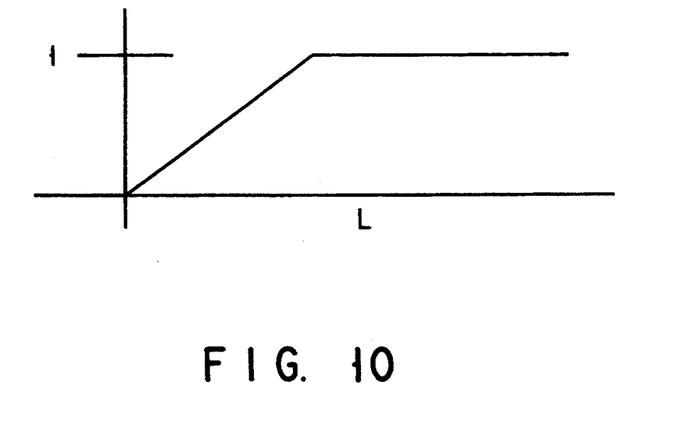
FIG. 10 is a graph illustrating a weight function for the length of a line segment.
Figure 11:
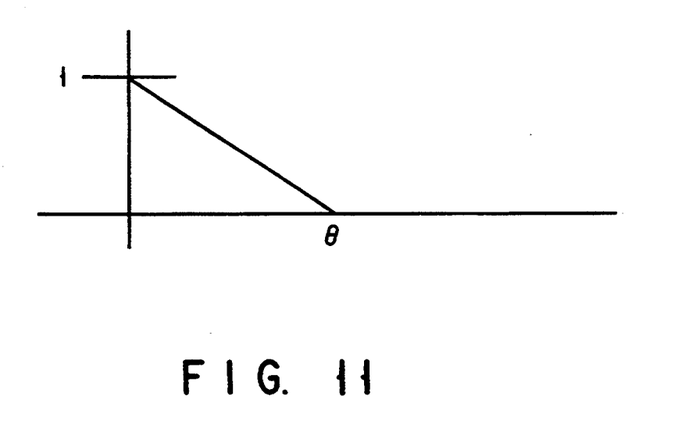
FIG. 11 is a graph illustrating a weight function for the angle formed by two line segments.

In the above embodiment, the compatible coefficients are determined in consideration only of the relationships among the categories of line segments. However, weight functions may be determined on the basis of the lengths of line segments and the angles formed between two line segments. If the compatible coefficients are multiplied with such weight functions, the contribution factor of the two-term function can be obtained. In this case, such a weight function as is exemplified by $d(j)=(f(j)+g(j))$ is generated in accordance with the lengths of line segments and the angle formed by two line segments, as is shown in FIGS. 10 and 11. In FIG. 10, symbol L denotes the length of line segment j, and a short line segment is not so influential as a long line segment. In FIG. 11, $\theta$ denotes a deviation angle which represents how the angle between two lines segments deviates from 90 degrees. The more the angle between the two line segments deviates from 90 degrees, the less the segments are influenced. In FIGS. 10 and 11, "L" corresponds to 150 picture elements (about 1 centimeter on the drawings) and angle $\theta$ is 180°. In practice, however, angle $\theta$ is in the range of 0° to 90°, so that the weight is within the range of 0.5 to 1.0.

Figure 12:
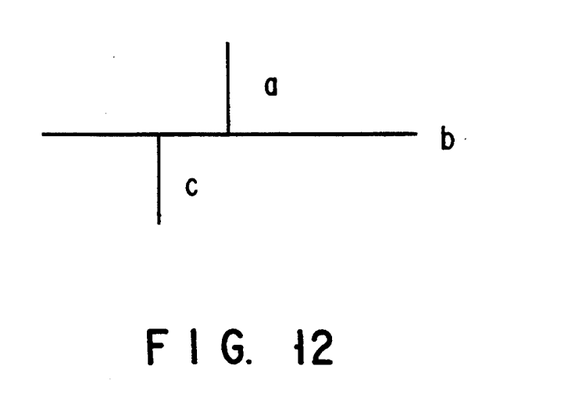
FIG. 12 illustrates how line segments shifted from the right position are construed on the basis of their relationships with other line segments.

According to the second embodiment mentioned above, the line segments shown in FIG. 12 may be construed as being made up of two "T"-shaped sections. However, there may be a case where the line segments shown in FIG. 12 should be construed as an intersection between two line segments. In this case, line segments a and c are adjusted in position such that they become continuous to each other as pretreatment, and the line figure shown in FIG. 12 is construed as an intersection between two line segments.

The present invention may be modified in various manners, without departing from the spirit and scope of the present invention.

What is claimed is:

1. A line segment construction device which construes attributes of line segments that constitute a line figure, comprising:

input means for inputting information regarding the line segments of the line figure;

accuracy-calculating means for calculating an initial accuracy with respect to the attributes of the line segments, on the basis of the information input by said input means;

connection-detecting means having a plurality of geometrical patterns each of which represents a connection relationship between two line segments, for detecting how the line segments are connected to other line segments with reference to said geometrical patterns on the basis of the information input by said input means;

accuracy-updating means for updating the initial accuracy in accordance with connections between the line segments detected by said connection-detecting means; and attribute-determining means for determining the attributes of the line segments on the basis of the accuracy updated by said accuracy-updating means; and control means for controlling said input means, said accuracy-calculating means, said connection-detecting means, said accuracy-updating means and said attribute-determining means.

2. A line segment construction device according to claim 1, wherein said input means includes means for obtaining information regarding the line segments by recognizing at least one of isolated data elements, said isolated data elements including a symbol and a character located in the vicinity of the line segments, and a symbol and a character connected to the line segments.

3. A line segment construction device according to claim 1, wherein said accuracy-calculating means includes means for performing pattern recognition of each of the line segments on the basis of the information regarding the line segments and for executing calculation of an accuracy on the basis of results of the pattern recognition.

4. A line segment construction device according to claim 1, wherein said accuracy-calculating means includes means for calculating the attributes of the line segments as probability information representing the accuracy.

5. A line segment construction device according to claim 1, wherein said connection-detecting means includes means for detecting a branch section, a coupling section and an intersection between line segments.

6. A line segment construction device according to claim 1, wherein said accuracy-updating means includes means for obtaining a contribution coefficient which represents connections between line segments and which is used for calculating a probability of certainty during update of the accuracy.

7. A line segment construction device according to claim 6, wherein said attribute-determining means includes means for determining, on the basis of a predetermined value, whether update of the accuracy performed by the accuracy-updating means should be stopped.

8. A line segment construction device according to claim 7, wherein said means for determining whether the update of the accuracy should be stopped includes means for stopping the calculation performed by the accuracy-updating means when the calculation has been repeated by the number of times determined as being appropriate by experience.

9. A line segment construction device according to claim 7, wherein said means for determining whether the update of the accuracy should be stopped includes means for stopping the calculation performed by the accuracy-updating means when the entropy of the accuracy has decreased and a stable state is obtained.

10. A line segment construction device according to claim 7, wherein said means for determining whether the update of the accuracy should be stopped includes means for automatically stopping the calculation performed by the accuracy-updating means when an absolute value of the contribution coefficient has become smaller than a predetermined threshold value.

11. A method for construing attributes of line segments that constitute a line figure, comprising the steps of:

inputting information regarding the line segments of the line figure;

calculating an initial accuracy with respect to the attributes of each of the line segments, on the basis of the information input in the inputting step;

preparing a plurality of geometrical patterns each of which represents connection relationship between two line segments;

detecting how the line segments are connected to other line segments with reference to said geometrical patterns on the basis of the information input in the inputting step;

updating the initial accuracy in accordance with connections between the line segments detected in the detecting step; and determining the attributes of the line segments on the basis of the accuracy updated in the updating step.

* * * * *